Sept. 7, 1937.  H. S. MICHAEL  2,092,583

PUZZLE

Filed Feb. 18, 1937  2 Sheets-Sheet 1

Sept. 7, 1937.   H. S. MICHAEL   2,092,583
PUZZLE
Filed Feb. 18, 1937   2 Sheets-Sheet 2
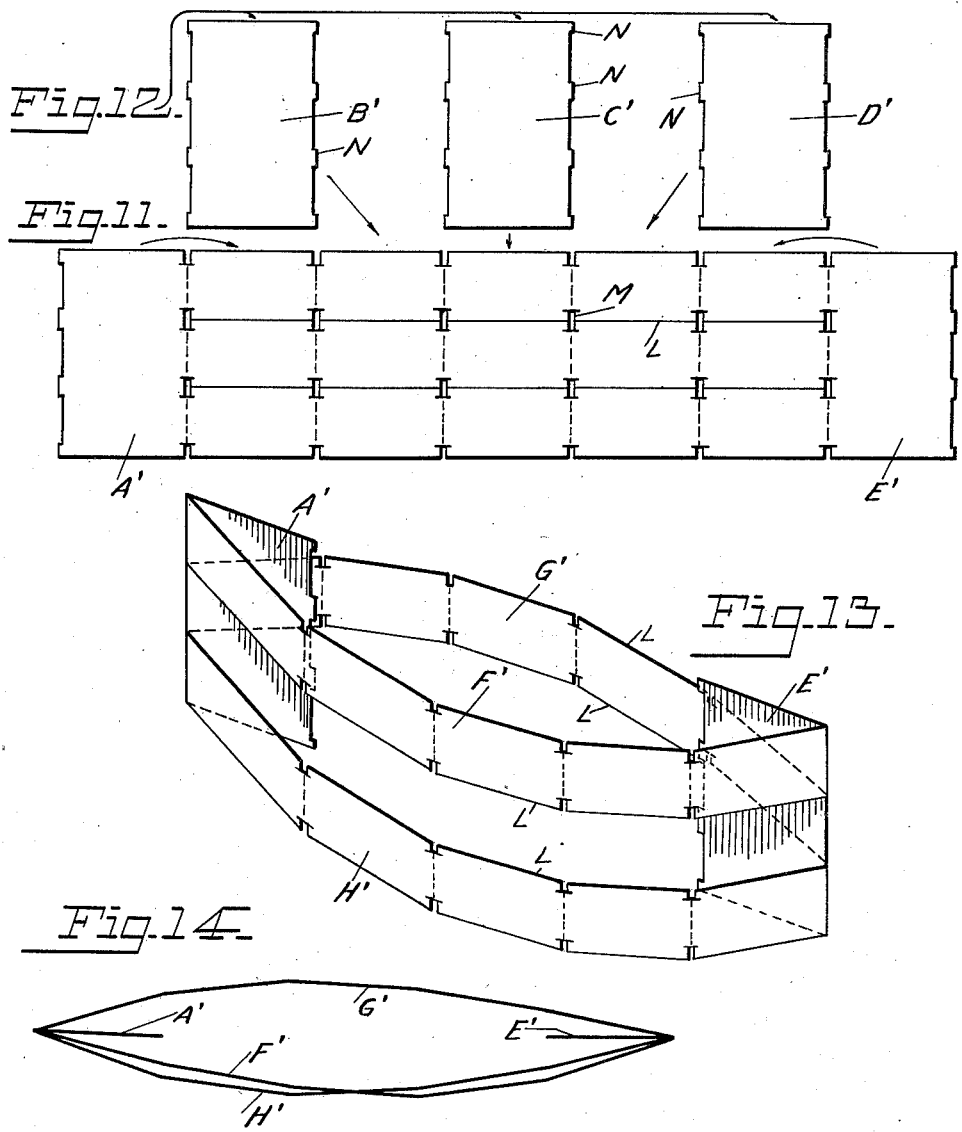
INVENTOR.
HOWARD S. MICHAEL.
by
his ATTORNEY.

Patented Sept. 7, 1937

2,092,583

UNITED STATES PATENT OFFICE 2,092,583

PUZZLE

Howard S. Michael, Dayton, Ohio

Application February 18, 1937, Serial No. 126,436

5 Claims. (Cl. 273—155)

This invention relates to a puzzle and is adapted primarily for use as an amusement device or an advertising novelty.

One object of the invention is to provide a strip of material comprising a plurality of sections bearing printed matter and adapted to be folded into a pack, the arrangement being such that when the pack is extended to strip form, by manipulating the sections in one manner, the extended strip will exhibit one arrangement of the printed matter and, when the pack is manipulated by manipulating the sections in another manner, the extended strip will exhibit another arrangement of the printed matter, to the mystification of an uninitiated observer.

A further object of the invention is to provide such a device which may be manipulated to successively exhibit three different arrangements of the printed matter.

A further object of the invention is to provide such a device comprising a plurality of cards and tapes both bearing printed matter and so assembled as to permit the various manipulations thereof to be quickly and easily accomplished.

A further object of the invention is to provide such a device which will be simple in its construction and which may be produced at a low cost.

Other objects of the invention may appear as the device is described in detail.

In the accompanying drawings Fig. 1 is a plan view of the device with the several parts thereof in a normal extended arrangement; Fig. 2 is a section taken longitudinally through the upper third of Fig. 1, showing an abnormal spacing of the cards and tapes for the purpose of illustration; Fig. 3 is a section taken on the line 3—3 of Fig. 5; Fig. 4 is an end view of the device of Fig. 2 in a partly folded condition; Fig. 5 is a plan view of the device extended as in Fig. 2, showing one arrangement of the printed matter on the cards and tapes; Fig. 6 is a plan view of the device extended in another manner and showing another arrangement of the printed matter; Fig. 7 is an end view of the device partially folded in a manner different from that shown in Fig. 4; Fig. 8 is a plan view of the device extended in still another manner to exhibit a third arrangement of the printed matter on the cards and tapes; Fig. 9 is a detail view of a portion of the device in its extended position; Fig. 10 is a section taken on the line 10—10 of Fig. 9; Fig. 11 is a plan view of a blank cut to form the tapes in one piece with the end cards; Fig. 12 is a detail view of the individual intermediate cards; Fig. 13 is a perspective view of the blank of Fig. 11 turned inside out to place the end cards between the tapes; and Fig. 14 is an edge view of the blank, as shown in Fig. 13.

The device, or puzzle, comprises essentially two groups of elements, one group including a series of cards, in the present instance five, A, B, C, D, and E, arranged in alphabetical order, and the second group including a plurality of parallel tapes F, G, and H, extending lengthwise of the series of cards and connecting the cards one with the other in such a manner that the cards may be reversed and tapes shifted lengthwise with relation to the cards. The cards and tapes bear printed matter so arranged that the shifting of the relative positions of the cards and tapes will cause the printed matter to be exhibited in different arrangements. This printed matter may be of any suitable character and, for the purpose of illustration, it is here shown as comprising numerals, 1 to 37, but in practice it will usually consist of a printed text, pictures or the like. For example, it may consist in part of a poem, the successive verses of which are printed on different parts of the tapes and cards in such a manner that in one arrangement of the tapes and cards the verses will appear in their proper order and in another arrangement of tapes and cards the verses will appear in a disordered arrangement. Therefore, the term "printed matter" as herein used is intended to include any matter that may be placed upon the cards and tapes for the purposes of exhibition.

The several tapes are attached at their ends to the respective end cards, A and E, of the series in such a manner that the movement of these end cards in opposite directions about axes extending transversely to the tapes will cause the tapes to move lengthwise with relation to the cards. The intermediate cards B, C, and D, are supported by but are not attached to the tapes, and each of the five cards is capable of pivotal movement about either of its lateral edges, thus permitting each card to be reversed and the tapes to be shifted with relation to the cards. With the cards and tapes in the positions shown in Figs. 2, 3, 4 and 5, the upper and lower tapes, F and H, as viewed in the drawings, are each attached at one end to the inner edge of the end card A and extend from that edge above the card B, beneath the card C, above the card D, beneath the end card E, then inwardly above the end card E and are attached at their ends to the inner edge of that card. The intermediate tape G is attached at one end to the inner edge of the card A, extends outwardly beneath that card, then inwardly above the same, beneath the card B, above the card C, beneath the card D and is connected at its other end to the inner edge of the end card E. Thus it will be apparent that each tape extends on opposite sides of adjacent cards and that the several tapes are arranged alternately on opposite sides of the same card. It may be noted here that in Figs. 2 to 8 the cards are spaced an abnormal distance one from the other and where a tape extends both above and below a card that portion beneath the card is shown in dotted lines as of a slightly greater width than the tape, to facilitate the illustration.

It will be obvious that the cards and tapes may be folded face to face to form a pack, as shown in Fig. 4. In that figure the cards and tapes are not completely folded but are slightly separated for the purpose of illustration and it will be understood that in practice they will be folded one against the other. The pack of cards and tapes, when folded as shown, would be held by the operator with that edge of the pack which is lowermost facing the operator and if, when the pack is held in that position, it is opened to extend the device by first moving the card A about its upper or rear edge and moving the card E about its lower or front edge the device will be extended to the position shown in Fig. 5, in which printed matter 1 to 15 is exhibited. If the pack when so folded is opened by first moving the card A about its lower or front edge and the card E about its upper or rear edge the device will be opened to the positions shown in Fig. 6 in which the printed matter 16 to 30 will be exhibited, it being noted that all the printed matter so exhibited is different from that exhibited in Fig. 5. If the cards and tapes are folded in the manner shown in Fig. 7, in which the end cards A and E are in positions the reverse of those shown in Fig. 4 and the device is extended by first moving card A about its lower or front edge and the card E about its upper or rear edge the device will be opened to the position shown in Fig. 8. With this arrangement of the cards and tapes there is exhibited an entirely different arrangement of printed matter, including 31 to 37, which are not exhibited in either Fig. 5 or Fig. 6, and including various parts of the printed matter of Fig. 5 but showing the same in different positions with relation to the cards. It will be noted that in all three arrangements the cards remain in alphabetical order but in Figs. 6 and 8 all the cards are reversed with relation to their positions in Fig. 5.

Referring to Figs. 4, 5, and 6, it will be noted that when the card A is moved about its upper or rear edge the inner face of the card, as shown in Fig. 4, becomes the uppermost face of the card in Fig. 5, and the tapes F and H are connected to the inner edge of that card while the tape G is wrapped about both sides of the card and as the device is opened the upper or rear edge of the card B remains adjacent to the upper edge of the card A. The printed matter 1 and 3 is on the upper and lower portions of the card A and the printed matter 2 is on the tape, while printed matter 4 and 6 is on the tapes and the printed matter 5 is on the intermediate exposed portion of the card B, and so on throughout the series of cards. When the card A is moved about its lower or front edge to the position shown in Fig. 6 the outer side of that card becomes the uppermost face of the card and the lower or front edge of the card B remains adjacent to the card A. Consequently both cards are reversed so that those sides which are uppermost in Fig. 5 are lowermost in Fig. 6. The tapes F and H are wrapped about one side of the card A and are therefore shifted lengthwise with relation to the other cards so that the portions of the tapes F and H bearing the printed matter 4 and 6 is concealed beneath card A while the portions which were previously concealed beneath the card C are now exposed above card B, and likewise throughout the series of cards. When the cards are folded as shown in Fig. 7, those sides of the cards A and E which are outermost in Fig. 4 are innermost in Fig. 7, and when opened by moving the card A about its lower or front edge the tapes F and H are shifted a further distance lengthwise of the series of cards so that other portions thereof are exposed above the respective cards, the cards themselves, however, remaining with the same face upward, as shown in Fig. 5, as indicated by the exposed faces 5 and 11 in Fig. 8. Thus by manipulating the cards in the three manners described a different and distinct arrangement of printed matter is exhibited upon each extension of the cards.

It will be understood that printed matter appears on both sides of the tapes and cards and that the printed matter appearing on the reverse side of the device, as shown in the several drawings, also changes its arrangement as the relative positions of the cards and tapes are changed.

The intermediate cards B, C and D being unattached to the tapes, it is desirable to provide some means to hold the same against displacement transversely to the tapes while the device is being manipulated and this is preferably accomplished by providing the cards and tapes with interengaging parts. As shown in Figs. 9 and 10, the intermediate cards are provided adjacent the edges of each tape with projections, such as ribs K, which engage the edges of the tapes in such a manner as to prevent the displacement of the cards without interfering with the normal movements of the cards about their lateral edges. It is not essential that the end cards A and E be provided with such ribs but, as shown in Fig. 9, the ends cards have been provided with ribs to impart the same general appearance to all the cards.

The end cards and the tapes may be attached one to the other in any suitable manner and in Fig. 9 the tapes are shown as pasted to the end cards but for the purpose of facilitating the printing and manufacture of an inexpensive device it is desirable that the tapes and end cards be formed from one piece of material, such as the blank shown in Fig. 11. This blank is provided with two longitudinal slits L which divide the intermediate portion of the blank into tapes but which are of such length that the end portions of the blank are unslitted and thus constitute the end cards, A' and E'. When the blank has been cut it is turned edgewise inside out so as to locate the end cards between the tapes, as shown in Figs. 13 and 14. It will be noted that in the arrangement shown in Fig. 13 the several tapes are connected with the end cards at the outer edges of the latter in the same manner as shown in Fig. 6. The intermediate cards, as shown at B', C', and D', are then inserted between the tapes in the manner shown in Fig. 6 and the device will operate in the same manner and is capable of exhibiting the printed matter in the same arrangements as shown in Figs. 5, 6, and 8.

In this form of the device I have shown another means for holding the intermediate cards against movement transversely to the tapes, this being accomplished by providing the tapes with notches M in the respective edges, the notches being formed in the line along which the tapes fold. The intermediate cards are formed with lateral projections or lips N which are spaced apart such distances as to receive between them the narrow portions of the tapes lying between the notches M, while the lips N may extend into the notches. When the device is folded the lips N will extend into the notches and when the device is extended the narrow portions of the tapes will be arranged between the lips, thus the cards will be held against displacement in all positions of the device.

While I have shown and described one embodiment of my invention, together with certain minor modifications thereof, I wish it to be understood that I do not desire to be limited to the details thereof as various modifications may occur to a person skilled in the art.

Having now fully described my invention, what I claim as new and desire to secure by Letters Patent, is:

1. In a device of the character described, a series of cards adapted to be arranged in alinement with their lateral edges adjacent one to the other, a plurality of tapes having supporting connection with said cards, a part of said tapes being attached at one end to the inner edge of one end card, extending alternately above and below the intermediate cards, wrapped once about the other end card and attached to the inner edge of the last mentioned end card, another part of said tapes being attached to the inner edge of the first mentioned end card, wrapped once about the same, extended alternately above and below the intermediate cards and attached to the inner edge of the last mentioned end card, said tapes being unattached to said intermediate cards and capable of longitudinal movement with relation thereto when said end cards are turned to wrap said tapes about and to unwrap the same from the respective end cards.

2. In a device of the character described, a series of cards adapted to be arranged in alinement with their lateral edges adjacent one to the other, a plurality of tapes having supporting connection with said cards, a part of said tapes being attached at one end to the inner edge of one end card, extending alternately above and below the intermediate cards, wrapped once about the other end card and attached to the inner edge of the last mentioned end card, another part of said tapes being attached to the inner edge of the first mentioned end card, wrapped once about the same, extended alternately above and below the intermediate cards and attached to the inner edge of the last mentioned end card, said tapes being unattached to said intermediate cards and all of said cards being so connected with said tapes that each card may have pivotal movement about either edge thereof, so that said cards may be folded face to face and by first moving one end card about one of its edges said device may be extended to exhibit one arrangement of said cards and tapes and by first moving said end card about its other edge said device may be extended to exhibit another arrangement of said cards and said tapes.

3. In a device of the character described, a series of cards adapted to be arranged side by side in the order A, B, C, D, and E, a plurality of parallel tapes extending lengthwise of said series of cards and arranged edge to edge in the order F, G, and H, the tapes F and H each being connected at one end to the inner edge of card A, extending therefrom above card B, beneath card C, above card D, beneath card E, then inwardly above card E and connected at its end with the inner edge of card E, and the tape G being connected at one end with the inner edge of card A, extending outwardly beneath that card, then inwardly above the same, beneath card B, above card C, beneath card D and connected at its other end with the inner edge of card E, said tapes being unattached to cards B, C, and D, each card being capable of pivotal movement about either lateral edge thereof so that the several cards and tapes may be folded face to face in a pack and when said pack is opened by first moving card A about one of its edges the cards and tapes will assume the aforesaid relative positions and when said pack is opened by first moving card A about its other edge said cards and tapes will assume relative positions other than the aforesaid positions.

4. In a device of the character described, a plurality of parallel tapes and a series of cards supported by said tapes for movement into alinement with their lateral edges adjacent one to the other, each card being capable of pivotal movement about either of its lateral edges, said tapes being unattached to the intermediate cards of said series and being attached at their ends to the same lateral edge of each of the end cards of said series, so that the pivotal movement of said end cards will cause said tapes to be folded onto or unfolded from said end cards and to be moved lengthwise with relation to all of said intermediate cards.

5. In a device of the character described, a plurality of parallel tapes and a series of cards supported by said tapes for movement into alinement with their lateral edges adjacent one to the other, each card being capable of pivotal movement about either of its lateral edges, said tapes being unattached to the intermediate cards of said series and being so connected with the end cards of said series that the pivotal movement of said end cards will cause said tapes to be folded onto or unfolded from said end cards and to be moved lengthwise with relation to all of said intermediate cards, each of said unattached intermediate cards being provided with projections between which the tapes are guided and held against transverse movement.

HOWARD S. MICHAEL.